US007553363B2

(12) United States Patent
Dellinger et al.

(10) Patent No.: US 7,553,363 B2
(45) Date of Patent: Jun. 30, 2009

(54) COMPOSITION FOR USE IN BIODEGRADABLE ARTICLES AND METHOD OF USE

(75) Inventors: David Dellinger, Santa Barbara, CA (US); Elie Helou, Jr., Santa Barbara, CA (US)

(73) Assignee: Biosphere Industries, LLC, Carpinteria, CA (US)

( * ) Notice: Subject to any disclaimer, the term of this patent is extended or adjusted under 35 U.S.C. 154(b) by 268 days.

(21) Appl. No.: 10/928,602

(22) Filed: Aug. 26, 2004

(65) Prior Publication Data

US 2005/0089606 A1 Apr. 28, 2005

Related U.S. Application Data

(60) Provisional application No. 60/498,396, filed on Aug. 27, 2003.

(51) Int. Cl.
*C08L 3/02* (2006.01)
*C08L 97/02* (2006.01)

(52) U.S. Cl. .............................. 106/162.51; 106/126.1; 106/127.1; 106/132.1; 106/133.1; 106/137.1; 106/141.1; 106/145.1; 106/205.1; 106/206.1; 106/209.1; 106/214.1; 106/215.1; 106/216.1; 106/217.01; 524/9; 524/21; 524/35; 524/55; 523/128

(58) Field of Classification Search .............. 106/126.1, 106/127.7, 132.1, 133.1, 137.1, 141.1, 145.1, 106/162.51, 205.1, 206.1, 209.1, 214.1, 215.1, 106/216.1, 217.01; 524/9, 21, 35, 55; 523/128
See application file for complete search history.

(56) References Cited

U.S. PATENT DOCUMENTS

| | | | |
|---|---|---|---|
| 1,875,482 A | 9/1932 | Nanna | |
| 3,772,076 A * | 11/1973 | Keim | 162/164.3 |
| 4,545,752 A | 10/1985 | Hanamoto et al. | |
| 4,639,341 A | 1/1987 | Hanamoto et al. | |
| 4,900,242 A | 2/1990 | Maus et al. | |
| 5,100,586 A | 3/1992 | Jennings et al. | |
| 5,169,566 A | 12/1992 | Stucky et al. | |
| 5,209,880 A | 5/1993 | Miwa | |
| 5,232,496 A | 8/1993 | Jennings et al. | |
| 5,352,111 A | 10/1994 | Selbak | |
| 5,354,621 A | 10/1994 | Liebermann | |
| 5,356,579 A | 10/1994 | Jennings et al. | |
| 5,358,676 A | 10/1994 | Jennings et al. | |
| 5,376,320 A | 12/1994 | Tiefenbacher et al. | |
| 5,385,764 A | 1/1995 | Andersen et al. | |
| 5,412,005 A | 5/1995 | Bastioli et al. | |
| 5,453,310 A | 9/1995 | Andersen et al. | |
| 5,506,046 A | 4/1996 | Andersen et al. | |
| 5,508,072 A | 4/1996 | Andersen et al. | |
| 5,514,430 A | 5/1996 | Andersen et al. | |
| 5,527,387 A | 6/1996 | Andersen et al. | |
| 5,543,186 A | 8/1996 | Andersen et al. | |
| 5,545,297 A | 8/1996 | Andersen et al. | |
| 5,545,450 A | 8/1996 | Andersen et al. | |
| 5,549,859 A | 8/1996 | Andersen et al. | |
| 5,580,409 A | 12/1996 | Andersen et al. | |
| 5,580,624 A | 12/1996 | Andersen et al. | |
| 5,582,670 A | 12/1996 | Andersen et al. | |
| 5,614,307 A | 3/1997 | Andersen et al. | |
| 5,618,341 A | 4/1997 | Andersen et al. | |
| 5,626,954 A | 5/1997 | Andersen et al. | |
| 5,631,052 A | 5/1997 | Andersen et al. | |
| 5,631,053 A | 5/1997 | Andersen et al. | |
| 5,631,097 A | 5/1997 | Andersen et al. | |
| 5,635,292 A | 6/1997 | Jennings et al. | |
| 5,637,412 A | 6/1997 | Jennings et al. | |
| 5,641,584 A | 6/1997 | Andersen et al. | |
| 5,654,048 A | 8/1997 | Andersen et al. | |
| 5,658,603 A | 8/1997 | Andersen et al. | |
| 5,658,624 A | 8/1997 | Anderson et al. | |
| 5,660,900 A | 8/1997 | Andersen et al. | |
| 5,660,903 A | 8/1997 | Andersen et al. | |
| 5,660,904 A | 8/1997 | Andersen et al. | |
| 5,662,731 A | 9/1997 | Anderson et al. | |
| 5,665,152 A * | 9/1997 | Bassi et al. | 106/145.1 |
| 5,665,439 A | 9/1997 | Andersen et al. | |
| 5,665,442 A | 9/1997 | Andersen et al. | |
| 5,676,905 A | 10/1997 | Andersen et al. | |

(Continued)

FOREIGN PATENT DOCUMENTS

EP 0752209 A1 1/1997

(Continued)

OTHER PUBLICATIONS

Ducey et al, "Alkaline Sizing Applications Surge Ahead", Alkaline Paper Advocate, Oct. 1996.*

(Continued)

*Primary Examiner*—David M Brunsman
(74) *Attorney, Agent, or Firm*—Perkins Coie LLP; Joseph P. Hamilton

(57) ABSTRACT

The present invention relates to a composition for use in making a starch-based food or beverage container, the formulation allowing the container to be water resistant for a usable amount of time without the need for coatings or similar. An embodiment of the formulation comprising water, native and pregelatinized starch, an insolubilizing compound, proteins or natural polymeric compounds, fibers, a wax emulsion, and a fiber-sizing agent.

85 Claims, No Drawings

U.S. PATENT DOCUMENTS

| | | | |
|---|---|---|---|
| 5,679,145 A | 10/1997 | Anderson et al. | |
| 5,679,381 A | 10/1997 | Andersen et al. | |
| 5,683,772 A | 11/1997 | Andersen et al. | |
| 5,691,014 A | 11/1997 | Andersen et al. | |
| 5,693,355 A | 12/1997 | Haas | |
| 5,695,811 A | 12/1997 | Andersen et al. | |
| 5,702,787 A | 12/1997 | Andersen et al. | |
| 5,705,203 A | 1/1998 | Andersen et al. | |
| 5,705,237 A | 1/1998 | Andersen et al. | |
| 5,705,238 A | 1/1998 | Andersen et al. | |
| 5,705,239 A | 1/1998 | Andersen et al. | |
| 5,705,242 A | 1/1998 | Andersen et al. | |
| 5,707,474 A | 1/1998 | Andersen et al. | |
| 5,709,827 A | 1/1998 | Andersen et al. | |
| 5,709,913 A | 1/1998 | Andersen et al. | |
| 5,714,217 A | 2/1998 | Andersen et al. | |
| 5,716,675 A | 2/1998 | Andersen et al. | |
| 5,720,913 A | 2/1998 | Andersen et al. | |
| 5,736,209 A | 4/1998 | Andersen et al. | |
| 5,738,921 A | 4/1998 | Andersen et al. | |
| 5,753,308 A | 5/1998 | Andersen et al. | |
| 5,766,525 A | 6/1998 | Andersen et al. | |
| 5,776,388 A | 7/1998 | Andersen et al. | |
| 5,783,126 A | 7/1998 | Andersen et al. | |
| 5,783,240 A | 7/1998 | Wenger et al. | |
| 5,786,080 A | 7/1998 | Andersen et al. | |
| 5,798,151 A | 8/1998 | Andersen et al. | |
| 5,800,647 A | 9/1998 | Andersen et al. | |
| 5,800,756 A | 9/1998 | Andersen et al. | |
| 5,810,961 A | 9/1998 | Andersen et al. | |
| 5,830,305 A | 11/1998 | Andersen et al. | |
| 5,830,548 A | 11/1998 | Andersen et al. | |
| 5,843,544 A | 12/1998 | Andersen et al. | |
| 5,851,634 A | 12/1998 | Andersen et al. | |
| 5,868,824 A | 2/1999 | Andersen et al. | |
| 5,928,741 A | 7/1999 | Andersen et al. | |
| 5,973,082 A | 10/1999 | Elmore | |
| 5,976,235 A | 11/1999 | Andersen et al. | |
| 6,030,673 A | 2/2000 | Andersen et al. | |
| 6,083,586 A | 7/2000 | Andersen et al. | |
| 6,090,195 A | 7/2000 | Andersen et al. | |
| 6,146,573 A * | 11/2000 | Shogren et al. | 264/241 |
| 6,168,857 B1 | 1/2001 | Andersen et al. | |
| 6,180,037 B1 | 1/2001 | Andersen et al. | |
| 6,200,404 B1 | 3/2001 | Andersen et al. | |
| 6,214,399 B1 | 4/2001 | Garbo | |
| 6,220,849 B1 | 4/2001 | Atake | |
| 6,231,970 B1 | 5/2001 | Andersen et al. | |
| 6,240,836 B1 | 6/2001 | Garbo | |
| 6,277,899 B1 | 8/2001 | Bastioli et al. | |
| 6,347,934 B1 | 2/2002 | Andersen et al. | |
| 6,379,446 B1 | 4/2002 | Andersen et al. | |
| 6,413,069 B2 | 7/2002 | Oono et al. | |
| 6,494,704 B1 | 12/2002 | Andersen et al. | |
| 6,585,859 B1 | 7/2003 | Hakansson | |
| 6,589,327 B1 * | 7/2003 | Snidow | 106/162.51 |
| 6,846,573 B2 | 1/2005 | Seydel | |
| 6,878,199 B2 * | 4/2005 | Bowden et al. | 106/162.5 |
| 7,196,124 B2 | 3/2007 | Parker et al. | |
| 2003/0047110 A1 | 3/2003 | Poovarodom et al. | |
| 2003/0143417 A1 * | 7/2003 | Kesselring et al. | 428/533 |
| 2004/0265453 A1 | 12/2004 | Helou, Jr. et al. | |
| 2006/0057319 A1 | 3/2006 | Gleich et al. | |
| 2006/0110498 A1 | 5/2006 | Dellinger | |

FOREIGN PATENT DOCUMENTS

| | | |
|---|---|---|
| EP | 0880896 A1 | 12/1998 |
| WO | 92/10938 A1 | 7/1992 |

OTHER PUBLICATIONS

International Search Report for International Application No. PCT/US04/27824 dated Feb. 20, 2007 (4 pages).

International Search Report for International Application No. PCT/US06/42800 dated May 2, 2007 (2 pages).

International Search Report for International Application No. PCT/US04/19619 dated Nov. 27, 2006 (5 pages).

United States Patent & Trademark Office; International Search Report and Written Opinion for PCT Application No. PCT/US07/88989, mailed Apr. 18, 2008.

European Patent Office; Supplemental Search Report for European Patent Application No. 04755659.2, mailed Jul. 28, 2008.

U.S. Patent And Trademark Office, International Search Report and Written Opinion for PCT/US2008/069266 mailed Oct. 2, 2008.

* cited by examiner

COMPOSITION FOR USE IN BIODEGRADABLE ARTICLES AND METHOD OF USE

COSS-REFERENCE TO RELATED APPLICATIONS

This application claims priority to U.S. Provisional Applications Ser. No. 60/498,396, filed Aug. 27, 2003,incorporated herein by reference.

BACKGROUND OF THE INVENTION

1. Field of the Invention

The invention generally relates to a mix formulation for the production of biodegradable goods and methods for use of said formulations.

2. Background

Conventional disposable food service items are commonly made from paper or paperboard (commonly coated or impregnated with a polymeric water-proofing material such as wax or polyethylene), or one of a variety of plastics (polystyrene is the most common). These materials have good to excellent resistance to moisture, can be made insulating (foamed polystyrene or "Styrofoam"), and are inexpensive and durable. The industrial production methods used to produce disposable packaging from these materials are mature; these items can be produced quickly and relatively cheaply in great quantities.

There is, however, a growing recognition that the environmental costs of using these "cheap" materials may be quite high. The expected lifetime of a polystyrene cup, for example, is about 500 years, and each American disposes an average of about 100 cups per year. Further, polystyrene is made by chemical processing of benzene and ethylene, both byproducts of the petroleum industry, and thus both non-renewable resources. Although the environmental record of the petroleum industry has improved greatly since the mid-twentieth century, extraction and processing of petroleum for fuel and chemical production remain recognized environmental problems.

Paper and paperboard are made from wood pulp, which is a renewable material. The regeneration time, however, for wood fiber—the time required to grow a tree—is substantial, and the chemical processing needed to produce white fibers has been recognized to be detrimental to the environment. The use of unbleached and recycled fibers helps alleviate these environmentally detrimental activities, but the use of slow-growing trees as a fiber source when many agricultural byproduct sources are available is in itself questionable.

The pressure to use biodegradable disposable packaging materials has been steadily increasing in the last decade. As recently as March, 2003, Taiwan outlawed the use of polystyrene foam in disposable packaging. China's major cities (e.g., Beijing and Shanghai) have also outlawed the use of polystyrene foam in disposable packaging.

To address the environmental concerns about conventional disposable food container products, one approach in the art has been the manufacture of starch-based disposable food service items such as trays, plates, and bowls. Starch-based packaging used in the art, however, currently has several drawbacks, the most important being that the containers are susceptible to water.

Specifically, cooked, unmodified starch is inherently water soluble. Because all of the starch-based biodegradable food service items currently being manufactured are formed in heated molds, much or all of the starch in these items is cooked, and the products thus formed are very sensitive to moisture. When exposed to water, other aqueous fluids, or significant amounts of water vapor, these items become very soft, losing form-stability and becoming susceptible to puncture by cutlery (e.g., knives and forks).

Manufacturers currently address the problem of the moisture-susceptibility of starch-based food-service items in two ways, either by not using the products in aqueous environments or by applying a coating to the product. One approach is to avoid the problem simply by marketing their food service items for uses in which aqueous fluids or vapor are not present (e.g., dry or deep-fried items). This approach greatly limits the potential markets for these items, since many food products either (1) are aqueous (e.g., beverages, soups), (2) include an aqueous phase (e.g., thin sauces, vegetables heated in water) or (3) give off water vapor as they cool (e.g., rice and other starchy foods, hot sandwiches, etc.)

Another approach is to protect the starch from contact with aqueous fluids or vapors by applying water-resistant coatings or films to the surfaces of the food service items, essentially forming a laminated structure in which a water-sensitive core is sandwiched between layers of a biodegradable water-resistant material. Many biodegradable coatings, however, are costly to obtain and difficult to apply, thus increasing manufacturing cost and complexity and reducing the percentage of acceptable finished products.

Further, in the current art, the mechanical properties of the matrix material (mainly starch) are critical to the performance of starch-based food service articles. Baked unmodified starch is typically quite fragile and brittle when dry, but relatively soft and pliable when the starch contains 5% to 10% moisture. In current practice, fiber is often added to the formulation to increase the flexural strength and fracture energy of starch-based items, especially during the period immediately after demolding, when the moisture content of the starch is very low. Even with the addition of significant amounts (10% or more) of fiber, however, starch-based articles are commonly very brittle immediately after demolding or when stored for extended periods in dry environments (heated buildings in winter, air conditioned buildings in summer, desert environments any time of year). Brittle failure of starch-based articles thus continues to present problems during the manufacturing process (especially before coatings or laminated films are applied) and when the articles are used in dry environments.

Moreover, in the current art, inorganic mineral fillers (e.g., calcium carbonate, silica, calcium sulfate, calcium sulfate hydrate, magnesium silicate, micaceous minerals, clay minerals, titanium dioxide, etc.) are often included in formulations used to produce starch-based biodegradable food service articles. These fillers are not, however, biodegradable. Marketing claims made for products using these materials as fillers point out that the materials are natural, renewable, and environmentally benign. However, there are inherent environmental costs associated with the mining (or synthesis) and processing of all inorganic filler materials.

Finally, in the current art, the most commonly used fiber in starch-based food service articles is wood-pulp fiber (similar to the paper based articles). As the main source material for the paper industry, it is readily available, is consistent in quality and material properties, and has the main properties needed to serve as structural elements in the finished food service articles. The use, however, of slow-growing trees as a fiber source when many agricultural byproduct sources are available is, as set forth above, in itself questionable.

Accordingly, there is a need for an improved system for producing water-resistant, biodegradable disposable items that can serve the full range of uses to which containers, boxes, plates, trays, and bowls are usually put, but which avoids the cost and complexity of film lamination or spray coating systems.

There is also a need for a means to enhance the mechanical properties of the matrix material in starch-based food service articles, in order (a) to ease handling requirements during manufacture and (b) to enhance usability in dry environments.

There is also a need for an improvement in the current art that will replace mineral fillers with fully biodegradable and renewable plant-based organic materials that serve the same role as traditional mineral fillers. Even greater benefit is available if the filler material is currently produced as a byproduct of the production of another agricultural material.

There is also a need for methods and formulations that incorporate fibrous materials from non-wood plants, and particularly from materials that are by products of commodities already in production.

SUMMARY OF THE INVENTION

It is an object of the present invention to provide an improved system for producing water-resistant, biodegradable disposable items that can serve the full range of uses to which containers, boxes, plates, trays, and bowls are usually put, but which avoids the cost and complexity of film lamination or spray coating systems.

It is another object of the present invention to provide improved the mechanical properties of matrix material in starch-based food service articles, in order (a) to ease handling requirements during manufacture and (b) to enhance usability in dry environments.

It is another object of the present invention to provide fully biodegradable and renewable plant-based organic materials that serve the same role as traditional mineral fillers in starch-based food containers.

It is another object of the present invention to provide methods and formulations that incorporate fibrous materials from non-wood plants, and particularly from materials that are by-products of commodities already in production.

These and other aspects of the present invention which may become obvious to those skilled in the art through the following description of the invention are achieved by a formulation used in making starch-based goods and a method fur use of said formulation.

One embodiment of the present invention is a composition comprising water, starch, a insolubilizing compound, a protein or natural polymeric compound, fibers, a wax emulsion, a fiber sizing agent, and a mold release agent.

DETAILED DESCRIPTION OF THE INVENTION

In order to fully understand the manner in which the above-recited details and other advantages and objects according to the invention are obtained, a more detailed description of the invention will be rendered by reference to specific embodiments thereof.

A formulation according to the present invention from which water-resistant packaging items (boxes, containers, plates, trays, bowls, and cups) can be produced is provided comprising water, starch, optionally insolubilizing compounds to reduce the moisture susceptibility of the starch portion of the baked food service items, optionally proteins and natural polymeric compounds to reduce the brittleness of the articles produced for use in dry environments and to prevent breakage immediately after forming when the items are typically dry, optionally several natural fibrous materials used in combination both as structural elements (at several size scales) in the baked items and as inexpensive organic replacements for inorganic fillers, optionally wax emulsions and/or fiber sizing agents are included in the formulation to increase water-resistance, and optionally a mold release agent to reduce adhesion between baked parts and the mold system.

Starch for use in the present embodiment may include, but is not limited to, plant sources such as tubers, roots, seeds, and/or fruits of plants, and specific plants sources may include corn, potato, tapioca, rice, or wheat or similar, or animal sources, namely glycogen, although plant sources are most preferred. Further, the starch is preferably provided as a combination of both pregelatinized and native starches. Preferably, pregelatinized starch has a concentration in the range of about 0% to about 30% by weight of total starch in the formulation, and more preferably 5% to 20%, and most preferably 7% to 15%.

Insolubilizing compounds (or cross-linking agents) have been used in the paper industry in the preparation of water-resistant coatings on paper to increase printability and decrease susceptibility to moisture. Insolublizers that may be used in the present embodiment include, but are not limited to, aqueous solutions containing modified ethandial, glyoxal-based reagents, ammonium zirconium carbonate, potassium zirconium carbonate, and polyamide-epichlorohydrine compounds. The amount of active ingredient of the insolubilizer used is up to about 20% by weight of the starch (including both native and pregelatinized starch), and is more preferred in the range from about 0.1% to about 20% by weight of starch, depending on the cross-linking system used and the specific application.

It has been found that in some cases in order to maximize the effectiveness of the insolubilizer used, it is necessary to adjust the pH of the formulation before adding the insolubilizing compound. It has also been found that depending upon the specific mix formulation some insolubilizer compounds react with the mix at low temperatures causing the mix to become too thick prior to molding. In such cases an insolubilizer with the desired properties should be selected.

Proteins and natural polymeric compounds may include, but are not limited to preparations made from casein and natural uncured latex or similar such preparations. One such preparation can be prepared in the following three steps: 1) cooking a solution of casein in water (about 10% casein by weight) as per usual manufacturer's recommendations (generally, hydrating the casein by soaking, then gradually raising the temperature and pH of the solution to 180° F. and pH=9 to 9.5, then holding the solution at 180° F. for 15 minutes); 2) cooling the preparation to room temperature; and 3) and adding the latex in an amount sufficient and blending thoroughly. The preferred ratio of latex to casein in the preparation is between about 1:1 to 2:1 (solids:solids), and a more preferred ratio is in a range from about 1.2:1 to about 1.8:1, and a most preferred ration is about 1.48:1. The ratio of casein to latex, however, may be adjusted according to the specific needs of the containers to be produced.

Moreover, other proteins may also be used in combination with the casein and latex preparation or separately to improve the water-resistant properties of the containers. For example, such proteins may include albumen, agar, gelatin, or the like.

Several natural fibrous materials may be used in combination both as structural elements (at several size scales) in the baked items and/or as inexpensive organic replacements for inorganic fillers. Fiber elements are used both to control the molding characteristics of the wet batter and to enhance the structural stability of the finished food service articles.

Although there is a continuum of fiber lengths and fiber aspect ratios used in the formulation, the fibrous portion of the formulation can be in a general sense separated into three classes (based on fiber length) that serve different functions. Long or very long (4 to 25 mm or longer) fibers or composite fiber elements are used to form a meshwork that helps prevent defects from forming in the batter as it expands in the mold. Medium-length fibers (0.5 to 5 mm) also help control the flow characteristics of the wet batter, and serve to increase the toughness of the finished food service articles, preventing fracture during handling and during normal use. Short fibers (<0.5 mm) serve mainly as a means to introduce readily biodegradable material into the formulation, i.e. filler material, that is, especially when treated with standard sizing agents, much more water-resistant than the starch-based matrix that contains them. (All types of fiber provide this functionality, but the presence of the medium, long, and very long fibers are required for the molding, handling and usage characteristics they provide, whereas the short fiber elements are present primarily for the contribution to water-resistance that they make.)

Optionally, the shorter fibers may be used in conjunction with, or replaced by other filler materials imparting the same advantages as the shorter fibers. For example, such filler materials may include both organic and inorganic aggregates such as calcium carbonate, silica, calcium sulfate, calcium sulfate hydrate, magnesium silicate, micaceous minerals, clay minerals, titanium dioxide, talc, etc. The preferred concentration of aggregate or short fibers is in a range from about 0% to about 25% by dry weight of the formulation, and more preferably in a range from about 5% to about 20% by total dry weight of the formulation, and most preferably in a range from about 10% to about 20% dry weight of the formulation.

Fibers from several sources are typically included in the formulation. Relatively high quality fibers from grass or reed species provide the mid-length fibers that contribute most to the structural stability and resilience if the finished articles. The long to very long fibers or fiber composites typically come from lightly processed agricultural byproducts, e.g. stalk or husk materials that have been chopped, ground, or milled to an appropriate size. Under appropriate processing conditions (e.g., hammer milling), these materials can also provide a considerable amount of the very short fiber that serves to replace starch and add water resistance to the finished article. Fibrous material in the form of ground nut shells (or other very hard, lignin-rich plant materials) may also serve as an organic, biodegradable fibers that are particularly water-resistant especially when treated with an optional fiber sizing agent.

Moreover, these other sources of fiber suitable as structural elements in starch-based food service articles are readily available. Some of these are from fast-growing plants that can be broadly characterized as grasses or reeds, such as kenaf and bamboo, which provide fiber with smaller associated environmental costs than taking fiber from trees. A growing segment of the fiber industry is based on the use of fiber from these plants. In many cases the quality and consistency of fibers taken from these plants (after processing) is as good as that provided by the wood pulp industry. In addition, fiber is also widely available as a by-product of agricultural production. Stalks, stems, and husks from cereal grains, for example, are a ready source of fibrous material that, while not as high in quality as the fiber taken from wood or the better grass species, is extremely cheap and, as a by-product, has essentially no additional environmental cost (beyond whatever environmental costs are associated with the production of the main crop).

The fibrous materials included in the formulations described here vary greatly in both fiber length and fiber aspect ratio. Overall, however, it is preferred that the materials have an average fiber length that is less than about 2 mm and an average aspect ratio that is in the range of about 5:1 to 25:1.

The preferred wax emulsions in the formulation used to increase water-resistance is a stable aqueous emulsion usually made of paraffin or microcrystalline wax; it sometimes contains rosin. It is usually prepared by means of emulsifying agents and mechanical agitation. The emulsion may be either acid- or alkali-stable, depending on the emulsifying agent employed. The wax emulsion may be made from natural waxes, for example, animal, vegetable or mineral, or synthetic waxes, for example, ethylenic polymers and poly ethyl esters, chlorinated naphthalenes, or hydrocarbon type waxes, depending on the particular application and desired properties for the final product. Examples of wax emulsions suitable for use in the present formulation include emulsified paraffin wax and emulsified polycrystalline wax. Emulsifying systems include both soap-based and lignosulfonate-based types.

The fiber sizing agent can be any suitable fiber sizing agent such that the agent forms a coating (or interphase) on the fiber surface to serve one or more of the following: as adhesion promoter (coupling agent); to protect the surface of the fibers from damage; as an aid in handling; to add strength or stiffness to the fibers; or to reduce absorbency. Examples of fiber sizing agents suitable for use in the present formulation include aklylketene dimer emulsions, alkenyl succinic anhydrides, aqueous dispersions of styrene acrylate copolymer, and alkylated melamine.

A mold release agent or abherent, is provided to reduce adhesion between baked parts and the mold system. Examples of specific mold release agents that are suitable for use in the present formulation include, but are not limited to magnesium stearate, talc, fats or oils or similar or a combination of any of the foregoing.

Containers fashioned from a mix formulation according to the present invention can be of varying shape and thickness depending upon the desired use for, and properties of, the final container. For example, the containers may be fashioned into open containers such as plates, cups, or bowls, clamshell containers, or any other useful configuration known in the art.

Further, the thickness of any portion of the container will preferably vary in the range from about 0.5 mm to about 3.2 mm, and more preferably from about 1.5 mm to about 3.0 mm, and most preferably from about 1.6 mm to about 2.5 mm. The thickness of the containers may also vary across the cross section of the container.

In another embodiment of the present invention a biodegradable material such as a coating and or sealant may be applied to containers fashioned from the mix formulation. Said biodegradable material may be applied such that it permeates the outer and or inner surface of the container improving water and heat resistant properties of the container. Said materials when applied as a coating, may partially or completely permeate the container matrix or a combination of a forming a coating and partially or completely permeating the container matrix.

A further embodiment of the invention is a method to produce a container or other article for use with food or beverage containers. Said method comprises providing the mix formulation set forth above; heating said mix in a mold of desired shape to form a container of a corresponding desired shape. Said method may further comprise steps set forth in U.S. patent application Ser. No. 10/608,441, filed Jun. 27, 2003, which, by reference, is incorporated herein in its entirety.

A further method according to the present invention comprises the steps of providing a mold apparatus having a cavity in the shape of a desired final product and a gap or gaps for venting vapor from the mold apparatus produced during heating or baking, heating or baking the mold apparatus, adding a mixture that is liquid or semi-liquid to the cavity of the mold apparatus prior to closing the mold apparatus and closing the mold apparatus, wherein as vapor or steam is produced in the cavity during heating or baking, the mixture is pushed by vapor or steam pressure to completely fill the cavity, and upon sufficient contact of the mixture to the heated mold apparatus a skin forms on the outer surface of the mixture, the skin being permeable or semi-permeable to the vapor or steam and the skin and gap being such that, in combination, they allow escape of steam or vapor from the cavity to the exterior of the mold apparatus but do not allow any significant amount of the mixture to escape. Any significant amount of mixture as referred to herein is any amount the loss of which would cause any one of the aforementioned drawbacks found in the prior art in a meaningful amount, such as waste of raw materials, waste of energy needed to heat additional mixture, additional processes to remove excess material to form the final product and clogging of the gap or gaps.

The vapor escapes while the mixture is retained in the cavity because the gap is of sufficient size—i.e., small enough—that the skin formed on the surface of the mixture from contact of the mixture with the heated mold surface, when under sufficient pressure from the steam or vapor produced during heating or baking of the mixture, allows the steam or vapor to escape through the skin and then through the gap to the exterior of the mold apparatus without rupture of the skin. Because the skin is not permeable to the mixture, which may still be liquid or semi-liquid prior to the completion of heating or baking, the mixture cannot escape from the cavity of the mold apparatus.

The aforementioned method according to the present invention allows for venting of the vapors produced during baking without significant loss of mixture and the associated drawbacks of said loss outlined above such as waste of raw materials, waste of energy needed to heat additional mixture, additional processes to remove excess material to form the final product and clogging of the gap or gaps.

The aforementioned method according to the present invention may be used to manufacture both edible baked goods and other baked products such as starch-based materials for use as food containers and the like. Mixtures for use in said method are typically water-based and include mixtures as described herein. One skilled in the art, however, will recognize that the mixtures need not be water-based, such as alcohol-based mixtures or other non-water-based mixtures. Specific examples of mixtures that may be used said method should be readily apparent to one skilled in the art and include, but are not limited to, common baking mixtures such as waffle, cookie dough, or ice cream cone batter, starch-based mixtures comprised of starch and water and mixtures comprising composite materials mixed with resins that form skins which are still permeable to the gases produced during heating or baking. Further, specific baking procedures such as heating temperature and time will vary depending upon the specific mixture to be heated or baked and should be apparent to one skilled in the art.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A composition for use in making a biodegradable container comprising:
   water;
   starch, wherein the starch comprises pregelatinized and native starch and wherein the pregelatinized starch is in a range from more than 0% to less than 30% by weight of the total starch in the composition;
   fibers, wherein a dispersion of the composition is such that the fibers are substantially separated from one another throughout a starch based matrix; and
   a wax.

2. The composition of claim 1 wherein the pregelatinized starch is in a range from more than 5% to less than 20% by weight of the total starch in the composition.

3. The composition of claim 1 wherein the pregelatinized starch is in a range from more than 7% to less than 15% by weight of the total starch in the composition.

4. The composition of claim 1 further comprising an insolubilizing compound and wherein the insolubilizing compound comprises an aqueous solution containing modified ethandial, glyoxal-based reagents, ammonium zirconium carbonate, potassium zirconium carbonate or polyamide-epichlorohydrin compounds.

5. The composition of claim 4 wherein the insolubilizing compound is in a concentration in a range from about 0.05% to about 3.0% by weight of the total starch in the composition.

6. The composition of claim 4 wherein the insolubilizing compound is in a concentration less than 20% by weight of total starch in the composition.

7. The composition of claim 4 wherein the insolubilizing compound is in a concentration in a range from about 0.1% to about 20% by weight of the total starch in the composition.

8. The composition of claim 1 further comprising casein and latex.

9. The composition of claim 8 wherein the latex is natural uncured latex.

10. The composition of claim 8 wherein the ratio of latex solids to casein solids is in a range between about 1 to 1 and about 2 to 1.

11. The composition of claim 8 wherein the ratio of latex solids to casein solids is in a range between about 1.2 to 1 and about 1.8 to 1.

12. The composition of claim 8 wherein the ratio of latex solids to casein solids is about 1.45 to 1.

13. The composition of claim 1 wherein the fibers comprise long fibers having a length of more than 4 mm, medium fibers having a length of 0.5 to 4 mm, and short fibers having a length of less than 0.5 mm.

14. The composition of claim 13 wherein the fibers comprise natural fibrous materials.

15. The composition of claim 14 wherein the fibers have an average fiber length less than about 2 mm.

16. The composition of claim 15 wherein the fibers have an average aspect ratio in the range of 5:1 to 25:1.

17. The composition of claim 1 comprising filler material.

18. The composition of claim 17 wherein the filler material is organic.

19. The composition of claim 17 wherein the filler material comprises calcium carbonate, silica, calcium sulfate hydrate, magnesium silicate, micaceous minerals, clay minerals, titanium dioxide or talc.

20. The composition of claim 17 further comprising short fibers, wherein filler material and/or short fibers have a combined concentration less than 25% by dry weight of the composition.

21. The composition of claim 17 further comprising short fibers, wherein filler material and/or short fibers have a combined concentration less than 20% and greater than 5% by dry weight of the composition.

22. The composition of claim 17 further comprising short fibers, wherein filler material and/or short fibers have a combined concentration less than 20% and greater than 10% by dry weight of the composition.

23. The composition of claim 1 wherein the fibers comprise fibers from grasses or reeds.

24. The composition of claim 1 wherein the composition comprises fibers available as the by product of agricultural production.

25. The composition of claim 1 wherein the wax comprises paraffin or microcrystalline wax.

26. The composition of claim 25 further comprising rosin.

27. The composition of claim 1 wherein the wax comprises natural wax.

28. The composition of claim 1 wherein the wax comprises hydrocarbon wax.

29. The composition of claim 1 further comprising a fiber sizing agent, wherein the fiber sizing agent forms a coating on at least a portion of the surface of at least a portion of the fibers to serve as an adhesion promoter, to protect the surface of the fibers from damage, as an aid in handling, to add strength or stiffness to the fiber, or to reduce absorbency.

30. The composition of claim 29 wherein the fiber sizing agent comprises alkylketene dimer emulsion, alkenyl succinic anhydride, styrene acrylate copolymer or alkylated melamine.

31. The composition of claim 1 further comprising a mold release agent.

32. The composition of claim 31 wherein the mold release agent comprises magnesium stearate, talc, fats or oils.

33. A composition for use in making biodegradable containers comprising:
water;
starch, wherein the starch comprises pregelatinized and native starch and wherein the pregelatinized starch is in a range from more than 0% to less than 30% by weight of the total starch in the composition;
an insolubilizing compound, wherein the insolubilizing compound comprises an aqueous solution comprising polyamide-epichlorohydrin compounds;
fibers, wherein a dispersion of the composition is such that the fibers are substantially seperated from one another throughout a starch based matrix;
a wax; and
a mold release agent.

34. The composition of claim 33 wherein the pregelatinized starch is in a range from more than 5% to less than 20% by weight of the total starch in the composition.

35. The composition of claim 33 wherein the pregelatinized starch is in a range from more than 7% to less than 15% by weight of the total starch in the composition.

36. The composition of claim 33 wherein the insolubilizing compound is in a concentration in a range from about 0.5% to about 3.0% by weight of total starch in the composition.

37. The composition of claim 36 wherein the fibers comprise long fibers having a length of more than 4 mm, medium fibers having a length of 0.05 to 4 mm, and short fibers having a length of less than 0.5 mm.

38. The composition of claim 37 wherein the fibers comprise natural fibrous materials.

39. The composition of claim 38 wherein the fibers have an average fiber length less than about 2 mm.

40. The composition of claim 39 wherein the fibers have an average aspect ratio in the range of 5:1 to 25:1.

41. The composition of claim 36 comprising filler material.

42. The composition of claim 41 wherein the filler material is organic.

43. The composition of claim 41 wherein the filler material comprises calcium carbonate, silica, calcium sulfate hydrate, magnesium silicate, micaceous minerals, clay minerals, titanium dioxide or talc.

44. The composition of claim 41 further comprising short fibers, wherein filler material and/or short fibers have a combined concentration less than 25% by dry weight of the composition.

45. The composition of claim 41 further comprising short fibers, wherein filler material and/or short fibers have a combined concentration less than 20% and greater than 5% by dry weight of the composition.

46. The composition of claim 41 further comprising short fibers, wherein filler material and/or short fibers have a combined concentration less than 20% and greater than 10% by dry weight of the composition.

47. The composition of claim 36 wherein the wax-comprises paraffin or microcrystalline wax.

48. The composition of claim 47 further comprising rosin.

49. The composition of claim 36 wherein the wax comprises natural wax.

50. The composition of claim 36 wherein the wax comprises hydrocarbon wax.

51. The composition of claim 36 further comprising a fiber sizing agent, wherein the fiber sizing agent forms a coating on at least a portion of the surface of at least a portion of the fibers to serve as an adhesion promoter, to protect the surface of the fibers from damage, as an aid in handling, to add strength or stiffness to the fiber, or to reduce absorbency.

52. The composition of claim 51 wherein the fiber sizing agent comprises alkylketene dimer emulsion, alkenyl succinic anhydride, styrene acrylate copolymer or alkylated melamine.

53. The composition of claim 36 wherein the mold release agent comprises magnesium stearate, talc, fats or oils.

54. The composition of claim 33 wherein the insolubilizing compound is in a concentration less than 20% by weight of total starch in the composition.

55. The composition of claim 54 wherein the insolubilizing compound is in a concentration in a range from about 0.1% to about 20% by weight of the total starch in the composition.

56. The composition of claim 33 further comprising casein and latex.

57. The composition of claim 56 wherein the latex is natural uncured latex.

58. The composition of claim 56 wherein the ratio of latex solids to casein solids is in a range between about 1 to 1 and about 2 to 1.

59. The composition of claim 56 wherein the ratio of latex solids to casein solids is in a range between about 1.2 to 1 and about 1.8 to 1.

60. The composition of claim 56 wherein the ratio of latex solids to casein solids is about 1.45 to 1.

61. The composition of claim 33 wherein the fibers comprise fibers from grasses or reeds.

62. The composition of claim 33 wherein the composition comprises fibers available as the by product of agricultural production.

63. A composition for use in making biodegradable containers comprising:
  water;
  starch comprising pregelatinized and native starch wherein the pregelatinized starch is in a range from more than 0% to less than 30% by weight of the total starch in the composition;
  an insolubilizing compound comprising an aqueous solution comprising polyamide-epichlorohydrine compounds;
  natural fibers, wherein a dispersion of the composition is such that the fibers are substantially separated from one another throughout a starch based matrix.

64. The composition of claim 63 wherein the pregelatinized starch is in a range from more than 5% to less than 20% by weight of the total starch in the composition.

65. The composition of claim 63 wherein the pregelatinized starch is in a range from more than 7% to less than 15% by weight of the total starch in the composition.

66. The composition of claim 63 wherein the insolubilizing compound is in a concentration less than 20% by weight of total starch in the composition.

67. The composition of claim 63 wherein the insolubilizing compound is in a concentration in a range from about 0.1% to about 20% by weight of the total starch in the composition.

68. The composition of claim 63 wherein the insolubilizing compound is in a concentration in a range from about 0.5% to about 3.0% by weight of total starch in the composition.

69. The composition of claim 63 further comprising a wax.

70. The composition of claim 69 wherein the wax comprises paraffin or microcrystalline wax.

71. The composition of claim 69 further comprising rosin.

72. The composition of claim 69 wherein the wax comprises natural wax.

73. The composition of claim 69 wherein the wax comprises hydrocarbon wax.

74. The composition of claim 63 wherein the fibers comprise long fibers having a length of more than 4 mm, medium fibers having a length of 0.05 to 4 mm, and short fibers having a length of less than 0.5 mm.

75. The composition of claim 63 wherein the fibers have an average fiber length less than about 2 mm.

76. The composition of claim 75 wherein the fibers have an average aspect ratio in the range of 5:1 to 25:1.

77. The composition of claim 63 further comprising a mold release agent.

78. The composition of claim 77, wherein the mold release agent comprises magnesium stearate, talc, fats or oils.

79. The composition of claim 63 further comprising a fiber sizing agent, wherein a fiber sizing agent comprises alkylketene dimer emulsion, alkenyl succinic anhydride, styrene acrylate copolymer or alkylated melamine.

80. The composition of claim 63 further comprising filler material.

81. The composition of claim 80 wherein the filler material is organic.

82. The composition of claim 80 wherein the filler material comprises calcium carbonate, silica, calcium sulfate hydrate, magnesium silicate, micaceous minerals, clay minerals, titanium dioxide or talc.

83. The composition of claim 80 further comprising short fibers, wherein filler material and/or short fibers have a combined concentration less than 25% by dry weight of the composition.

84. The composition of claim 80 further comprising short fibers, wherein the filler material and/or short fibers have a combined concentration less than 20% and greater than 5% by dry weight of the composition.

85. The composition of claim 80 further comprising short fibers, wherein filler material and/or short fibers have a combined concentration less than 20% and greater than 10% by dry weight of the composition.

\* \* \* \* \*

UNITED STATES PATENT AND TRADEMARK OFFICE
CERTIFICATE OF CORRECTION

| | | |
|---|---|---|
| PATENT NO. | : 7,553,363 B2 | Page 1 of 1 |
| APPLICATION NO. | : 10/928602 | |
| DATED | : June 30, 2009 | |
| INVENTOR(S) | : David Dellinger et al. | |

It is certified that error appears in the above-identified patent and that said Letters Patent is hereby corrected as shown below:

Column 9, line 66 (claim 37), replace "0.05" with --0.5--.

Column 12, line 3 (claim 74), replace "0.05" with --0.5--.

Signed and Sealed this

Sixth Day of October, 2009

David J. Kappos
*Director of the United States Patent and Trademark Office*